United States Patent [19]

Ochoa et al.

[11] Patent Number: 4,838,644
[45] Date of Patent: Jun. 13, 1989

[54] POSITION, ROTATION, AND INTENSITY INVARIANT RECOGNIZING METHOD

[75] Inventors: Ellen Ochoa, Pleasanton; George F. Schils, San Ramon; Donald W. Sweeney, Alamo, all of Calif.

[73] Assignee: The United States of America as represented by the United States Department of Energy, Washington, D.C.

[21] Appl. No.: 96,434

[22] Filed: Sep. 15, 1987

[51] Int. Cl.$^4$ .................. G02B 27/46; G06G 9/00; G06K 9/76; G06K 9/36
[52] U.S. Cl. .................. 350/162.13; 364/822; 382/31; 382/42; 382/43
[58] Field of Search .................. 350/162.12, 162.13, 350/162.14, 162.15; 364/822; 382/31, 42, 43

[56] References Cited

U.S. PATENT DOCUMENTS

| | | | |
|---|---|---|---|
| 4,073,010 | 2/1978 | Casasent et al. | 382/43 X |
| 4,084,255 | 4/1978 | Casasent et al. | 382/42 |
| 4,308,521 | 12/1981 | Casasent et al. | 382/43 X |
| 4,490,851 | 12/1984 | Gerhart et al. | 382/43 |

OTHER PUBLICATIONS (S1660 0078) Fujii, H. et al., *Optics Communications* 36(4), 15 Feb. '81, pp. 255–257.
(S 0420 0069) Fujii, H. et al., *Appl. Optics* 19(7), 1 Apr. 1980, pp. 1190–1195.
Hsu, Y. et al., *Applied Optics* 23(6), 15 Mar. '84, pp. 841–844.
(S0420 0070) Iwamoto, A. et al., *Appl. Optics* 19(7), 1 Apr. 1980, pp. 1196–1200.
"Optical Pattern Recognition Using Circular Harmonic Expansion", Y. Hsu & H. Arsenault, *Applied Optics*, vol. 21, No. 22, 11/15/82, pp. 4016–4019.
"Optical Character Recognition Based on Nonredundant Correlation Measurements", B. Braunecker, R. Hauck, & A. Lohmann, *Applied Optics*, vol. 18, No. 16, 08/15/79, pp. 2746–2753.
"Unified Synthetic Discriminant Function Computational Formulation", D. Casasent, *Applied Optics*, vol. 23, No. 10, 05/15/84, pp. 1620–1627.
"Linear Combinations of Filters for Character Recognition: A Unified Treatment", H. Caulfield, *Applied Optics*, vol. 19, No. 23, 12/01/80, pp. 3877–3878.

(List continued on next page.)

*Primary Examiner*—Bruce Y. Arnold
*Assistant Examiner*—David J. Edmondson
*Attorney, Agent, or Firm*—Anne D. Daniel; James H. Chafin; William R. Moser

[57] ABSTRACT

A method for recognizing the presence of a particular target in a field of view which is target position, rotation, and intensity invariant includes the preparing of a target-specific invariant filter from a combination of all eigen-modes of a pattern of the particular target. Coherent radiation from the field of view is then imaged into an optical correlator in which the invariant filter is located. The invariant filter is rotated in the frequency plane of the optical correlator in order to produce a constant-amplitude rotational response in a correlation output plane when the particular target is present in the field of view. Any constant response is thus detected in the output plane to determine whether a particular target is present in the field of view. Preferably, a temporal pattern is imaged in the output plane with an optical detector having a plurality of pixels and a correlation coefficient for each pixel is determined by accumulating the intensity and intensity-squared of each pixel. The orbiting of the constant response caused by the filter rotation is also preferably eliminated either by the use of two orthogonal mirrors pivoted correspondingly to the rotation of the filter or the attaching of a refracting wedge to the filter to remove the offset angle. Preferably, detection of the temporal pattern in the output plane is performed at a plurality of arbitrary angles with angular separation sufficient to decorrelate successive frames.

6 Claims, 1 Drawing Sheet

OTHER PUBLICATIONS

"Nondetour Phase Digital Holograms: An Analysis: Errata", N. Gallagher & J. Bucklew, *Applied Optics*, vol. 19, No. 24, 12/15/80, pp. 4266-4272.

"Rotationally Invariant Correlation Filtering", G. Schils and D. Sweeney, *Journal of the Optical Society of America-A*, vol. 2, No. 9, Sep. 85, pp. 1411-1418.

"Iterative Synthesis of Distortion Invariant Optical Correlation Filters", G. Schils & D. Sweeney, *Optical Society of America*, Apr. 2, 1986, pp. 31-34.

"Iterative Technique for the Synthesis of Optical-Correlation Filters", G. Schils & D. Sweeney, *Journal of the Optical Society of America-A*, vol. 3, No. 9, Sep. 1986, pp. 1433-1442.

"Iteratively Designed Optical Correlation Filters for Distortion Invariant Recognition", G. Schils, & D. Sweeney, *Hybrid Image Processing, Proceedings of SPIE*, 10/15/86, vol. 638, pp. 102-110.

"Iterative Technique for the Synthesis of Distortion-Invariant Optical Correlation Filters", G. Schils & D. Sweeney, *Optics Letters*, vol. 12, No. 5, May 87, pp. 307-309.

"Experimental Use of Iteratively Designed Rotation Invariant Correlation Filters", D. Sweeney, E. Ochoa, & G. Schils, *Applied Optics*, vol. 26, No. 16, 08/15/87, pp. 3458-3465.

"Sandia Develops New Pattern Recognizer", *Aviation Week and Space Technology*, 02/09/83, p. 133.

"New Method Developed for Optical Pattern Recognition", *Sandia Science News*, vol. 21, No. 10, Oct. 1986, p. 1.

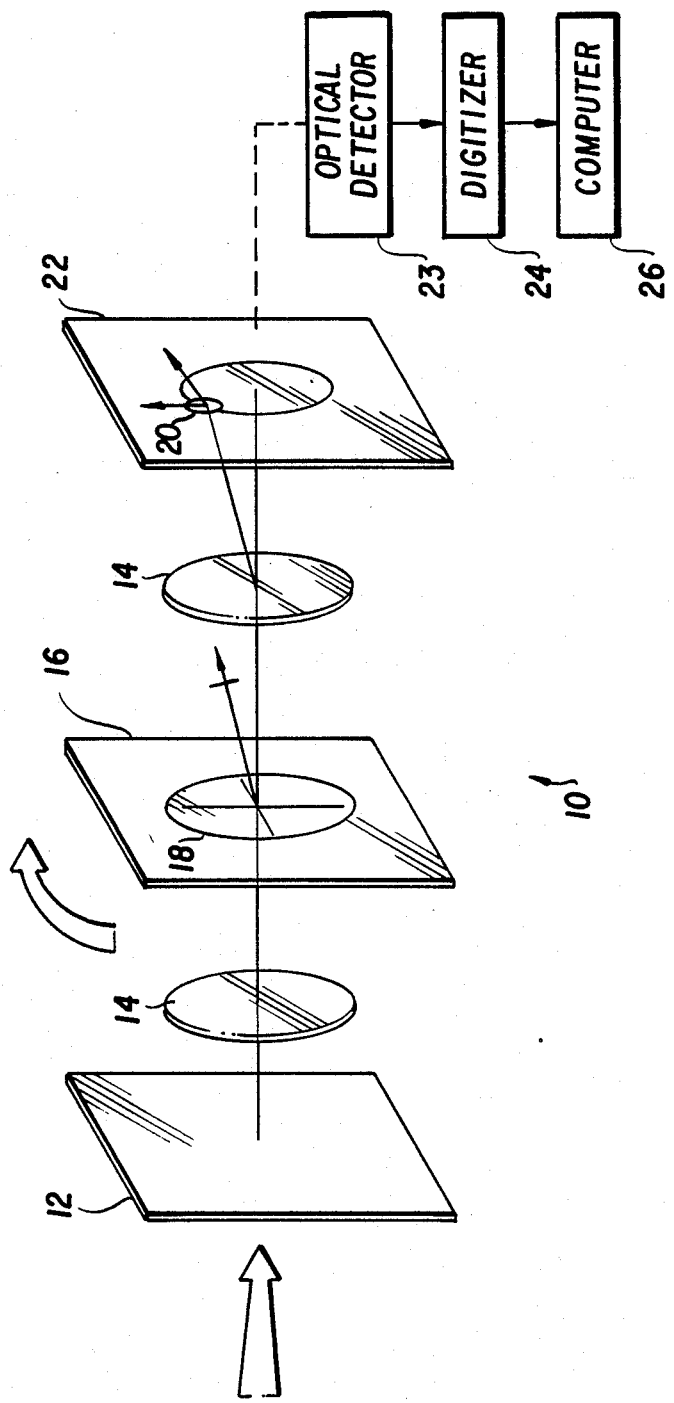

POSITION, ROTATION, AND INTENSITY INVARIANT RECOGNIZING METHOD

The U.S. Government has rights in this invention pursuant to Contract No. DE-AC04-76DP00789 between the U.S. Department of Energy and AT&T Technologies, Inc.

FIELD OF THE INVENTION

The present invention relates generally to optical pattern recognition methods, and more particularly to an optical pattern recognizing method which is position, rotation, and intensity invariant.

BACKGROUND OF THE INVENTION

Existing holographic pattern recognition systems can identify a target rapidly by matching it to information stored in the holographic template. However, such systems suffer a basic limitation in that target images must match the template exactly—in scale, rotation, and angle of view.

Disclosed in U.S. Pat. No. 4,073,010 (Casasent et al.), No. 4,084,255 (Casasent et al.), and No. 4,308,521 (Casasent et al.) are optical image processors that are distortion invariant. As described broadly in the latter patent, a space variant system in which the input scene is predistorted using coordinate transformations is provided. The idea is to predistort the input target so that the distortion which is sought to be rendered invariant manifests itself as a linear shift in the distorted coordinate system. Thus, if the input scene is mapped into polar coordinates, then a rotation of the input scene results in a linear shift in the polar coordinate space. With such a system, one can use a classical optical correlator and matched filter which is shift invariant to detect the distorted target. However, it should be appreciated that the practical implementation of the system requires a loss of some useful target information. A system which is scale and shift invariant is specifically disclosed in the first mentioned patent, while the second mentioned patent uses this technique for scale, rotation, and position invariance. It should also be appreciated that the systems are space variant and require segmentation of the input scene so that only one target is presented at any one time.

In U.S. Pat. No. 4,490,851 (Gerhart et al.), a fully digital technique for data reduction in classification is disclosed. This technique is not target specific because large amounts of target information are lost and it is also not rotation invariant.

A rotationally invariant filter is disclosed in: "Optical Pattern Recognition Using Circular Harmonic Expansion", Y. Hsu and H. Arsenault, *Applied Optics*, Vol. 21, No. 22, 15 Nov.1982, pp. 4016–4019. The filter is a computer-generated hologram designed to match one of the circular (Fourier) angular harmonics of the target. This filter is not target specific because only one angular harmonic is used. Such circular harmonic filters are also related to linear combination filters as disclosed in: "Optical Character Recognition Based on Nonredundant Correlation Measurements", B. Braunecker, R. Hauck, and A. Lohmann, *Applied Optics*, Vol. 18, No. 16, 15 Aug. 1979, pp. 2746–2753; "Unified Synthetic Discriminant Function Computational Formulation", D. Casasent, *Applied Optics*, Vol. 23 , No. 10, 15 May 1984, pp. 1620–1627; and "Linear Combinations of Filters for Character Recognition: A Unified Treatment", H. Caulfield, *Applied Optics*, Vol. 19, No. 23, 1 Dec. 1980, pp. 3877–3878. This relationship is shown by "Rotationally Invariant Correlation Filtering", G. Schils and D. Sweeney, *Journal of the Optical Society of America-A*, 2, p. 1411 (1985). All of these references are herein incorporated by reference.

SUMMARY OF THE INVENTION

In accordance with the present invention, a method for recognizing the presence of a particular target in a field of view which is target position, rotation, and intensity invariant is provided. Initially, a target-specific invariant filter is prepared from a combination of all of the eigen-modes of a pattern of the particular target. Coherent radiation from the field of view is then imaged into an optical correlator containing the filter. The invariant filter is rotated in the frequency plane of the optical correlator in order to produce a constant-amplitude rotational response in a correlation output plane when the particular target is present in the field of view. Then, any constant response in the ouput plane is detected to determine whether a particular target is present in the field of view.

Preferably, the detecting step includes the steps of imaging a temporal pattern in the output plane with an optical detector having a plurality of pixels. A correlation coefficient for each pixel is then determined where a correlation coefficient of unity indicates the presence of a temporal signature of the particular target. The correlation coefficient is determined by accumulating the intensity and intensity-squared of each pixel so that the correlation coefficient is calculated from $$(1/N) \Sigma_k I_k / \sqrt{(1/N) \Sigma_k I_k^2}$$

In the preferred embodiment, the preparation of the filter includes the step of encoding computer generated holograms using an electron beam to produce a frequency plane filter. Preferably, a maximum computed amplitude of the filter is clipped by about 0.7 of the maximum before the encoding step is performed.

The filter should be rotated about the center thereof. This rotating causes an orbiting of the constant response, which orbiting is preferably eliminated. Elimination can be provided by folding of the orbiting constant response with the use of two orthogonal mirrors which are pivoted corresponding to the rotation of the filter. Alternatively, a refracting wedge is attached to the filter to remove the offset angle thereof.

In the preferred embodiment, the detecting step includes the imaging of a temporal pattern at the output plane at a plurality of different angles of rotation of the filter. These different angles are preferably separated by at least 10°.

It is an advantage of the present invention that the recognizing method identifies a target image regardless of position, brightness, or rotation in the field of view without sacrificing target specificity. The present method is effective even if the target is partially obscured by other objects, altered in apppearance by reflections or glint, or buried in visual noise.

It is also an advantage of the present invention that "real-world" optical pattern recognition applications are allowed because less than ideal visibility does not preclude proper recognition. Thus, the present invention has applications in identification of military targets such as flying objects, as well as aerial reconnaissance for both military and civilian purposes. Other potential uses are in biology and medicine for microscopic detection and identification of arbitrarily oriented cells or hazardous tissue.

Other features and advantages of the present invention are stated and are apparent from a detailed description of presently preferred embodiments of the invention found hereinbelow.

BRIEF DESCRIPTION OF THE DRAWING

The single FIGURE is a schematic representation of an optical correlator and associated data processing according to the present invention.

DETAILED DESCRIPTION OF THE PREFERRED EMBODIMENTS

In order for optical pattern recognition systems to be practical, they must be able to accurately identify the pattern of interest subjected to various geometric distortions. Examples of such distortions are changes in position of the target in the field of view, rotation, scale, and intensity. The present invention provides a method which detects a specific target pattern regardless of position, rotation, and intensity of the target pattern in the input field of view.

An optical correlation system with input f(r) and filter g(r) evaluates the inner product between these two functions for all points in an input image. A suitable optical correlation system 10 is depicted including an input plane 12 for incident coherent illumination. Lenses 14 are provided on either side of a frequency plane 16 of the optical correlation system 10. As explained subsequently, a holographic filter 18 produces a correlation signal 20 in an output plane 22 of the optical correlation system 10.

In use, for filter 18 to be invariant in a target recognition system, it is required that the amplitude of the inner product be a constant independent of the distortion. This implementation is satisfactory if the location of the constant amplitude inner product can be found. This is accomplished using a procedure called "spanning the distortion space", a generalized concept used in connection with rotation invariant filters which means spinning or rotating the filter or using a "library" of, or multiple, filters to obtain the invariance. In the situation where a library is used, each of the multiple filters are a different rotation of the invariant filter. This procedure is also discussed in the following references, which are herein incorporated by reference: "An Iterative Technique for the Synthesis of Optical Correlation Filters", G. Schils and D. Sweeney, *Journal of the Optical Society of America-A*, Vol. 3, 1433 (1986); "Iterative Technique for the Synthesis of Distortion-Invariant Optical Correlation Filters", G. Schils and D. Sweeney, *Optics Letters* 12, 307 (1987); and "Experimental Application of Iteratively Designed Rotation Invariant Correlation Filters", D. Sweeney, E. Ochoa, and G. Schils, to appear in *Applied Optics*, 15 Aug. 1987.

The design methodology for, and fabrication of, the holographic filter 18 is described below. The invariant modes for rotation are Fourier angular harmonics. As indicated in the Hsu and Arsenault reference discussed above, filters fabricated from one of these angular harmonics creates a rotationally invariant filter. Since these circular harmonic filters are related to linear combination filters as also indicated in the above-identified references, a filter containing all the information about the target image may be fabricated from a linear combination of these angular harmonics.

The angular Fourier series expansion of the target image $f(r,\theta)$ is $$f(r,\theta) = \sum_{m=-\infty}^{\infty} f_m(r) e^{im\theta} \quad (1)$$

$$\text{where } f_m(r)(\tfrac{1}{2}\pi) \int_0^{2\pi} f(r,\theta) e^{-im\theta} d\theta \quad (2)$$

The filter is defined to be a weighted linear combination of the target image modes, that is $$g(r,\theta) = \sum_{m=-\infty}^{\infty} (2\pi a_m^*) f_m(r) e^{im\theta} \quad (3)$$

where the complex coefficients $(2\pi a_m^*)$ are unknown linear weights. The filter is a generalized template for the target image. Note that if $2\pi a_m^* = 1$ for all m, the filter is a matched filter.

As shown in the last mentioned Schils and Sweeney reference, an input target rotated by an angle $\alpha$ and correlated with the filter described by the above equation produces an output of the form $$C^{fg}(\alpha) = \sum_{m=-\infty}^{\infty} c_m e^{im\alpha} = \sum_{m=-\infty}^{\infty} 2\pi a_m E_m e^{im\alpha}, \quad (4)$$

$$\text{where } E_m = 2\pi \int_0^{\infty} |f_m(r)|^2 r dr. \quad (5)$$

The objective is to find the proper sequence of weighting functions $(2\pi a_m^*)$ that provides the desired constant-amplitude response. That is, $$|C^{fg}(\alpha)| = \text{constant}. \quad (6)$$

The phase of $C^{fg}(\alpha)$ is arbitrary, so there may be many solutions. This degree of freedom in the phase of $C^{fg}(\alpha)$ is used to introduce an added restraint on the filter. The filter is thus required to contain all of the angular modes with about the same weight as the original target image f. Mathematically, this is expressed by the requirement $$|2\pi a_m| \approx 1. \quad (7)$$

The requirements on the filter expressed by the above two equations are constraints that appear in opposite Fourier domains. The phase distributions for the $2\pi a_m$ and $C^{fg}(\alpha)$ are free parameters that can be adjusted to satisfy the constraints given by Equation (6) and (7). The objective, therefore, is to find a Fourier transform pair that has a specified amplitude in each domain.

The phases in each angular domain are found by an iterative technique. The synthesis method is the one-dimensional analogue of the iterative techniques used for phase determination. The iterative synthesis begins with a $2\pi a_m$ coefficients of unit amplitude and random phase. Using the initial $2\pi a_m$ coefficients, the rotational response $C^{fg}(\alpha)$ is constructed by the above-identified equation. The constraint on the rotational response (absolute value=constant) is imposed by forcing the amplitude to be unity while preserving the phase. This modified response is decomposed into angular harmonics to form a new set $2\pi a_m$. The constraints in the angular harmonic domain (absolute value=approximately 1)

are imposed by setting the amplitude of $2\pi a_m$ to unity while preserving the phase. This modified set of $2\pi a_m$ terms is used once again to construct a rotational response, and the iterations through the loop are repeated.

The numeral computation of the angular series expansion is truncated to a finite number of angular harmonics. In general, termination of the angular series expansion at 256 terms is satisfactory. The number of angular harmonics present in the filter is manipulated by adjusting the weighting factor constraint in equation (7). To improve filter performance, the $m=0$ term is eliminated. After several hundred iterations, the weighting coefficients are no longer changing and the iteration process is terminated. Further details concerning convergence are shown in "An Iterative Technique for the Synthesis of Optical Correlation Filters" identified above.

Rotationally invariant filters have been designed and fabricated using these methods. The filters are complex valued and are not themselves rotationally symmetric. The rotational invariant filter 18 is implemented by rotating it in the Fourier or frequency plane 16 of optical correlation system 10. Rotation of filter 18 computes its rotational response to the input image contained in input plane 12. Only the target image in input plane 12 properly produces a constant-amplitude rotational response or correlation signal 20. Thus, targets are located at those points in the correlation or output plane 22 where the intensity is constant. Detection of this constant intensity condition is equivalent to performing a full three-dimensional correlation operation. Detection is translationally and rotationally invariant and yet is fully specific to the target image.

The optimum linear technique for detecting the constant intensity signal is to correlate the data with a filter matched to a constant. Thus, at each point a correlation coefficient $\rho$ is evaluated as the normalized inner product between the constant C and the intensity values $I_k$ at that point from every frame where $$\rho = (1/N) \sum_{k=1}^{N} I_k C / \sqrt{(1/N)\Sigma_k I_k^2} \sqrt{(1/N)\Sigma_k C^2}$$

$$= (1/N)\Sigma_k I_k / \sqrt{(1/N) \Sigma_k I_k^2}.$$

Denoting the mean intensity as $\mu$ and the standard deviation of the intensity as $\sigma$ results in $$\rho = \mu / \sqrt{\mu^2 + \sigma^2}. \quad (10)$$

At most pixels, the variation in intensity between frames resembles speckle for which the mean and the standard deviation are equal. However, at points of constancy, the standard deviation approaches 0 and $\rho$ approaches unity.

From equation 9, it is seen that detection of the target is performed using only two buffers to process the data recognized by digitizer 24 and a suitable optical detector (23). As filter 18 is rotated in frequency plane 16, the two buffers accumulate the intensity and the intensity-squared at each pixel in correlation output plane 22. The correlation coefficient is then computed by use of computer 26 from these two moments as indicated by the equation.

The added complexity introduced by rotation of filter 18 is justified for several reasons. First, it is required to make the filter rotationally invariant. Second, signal integration over rotation is responsible for the excellent performance of the filter in a noisy environment. Lastly, the target is detected by its temporal signal rather than a maximum signal level so that energy normalization is not required.

As noted above, a critical issue of the present invention concerns the ability of the invariant filter to detect target images that are corrupted by noise. To study this question, optical correlation system 10 was digitally simulated. The input seen was sampled at 256×256 locations and correlated (using FFT routines) with holographic filter 18. The rotated filter 18 was computed using bi-linear interpolation.

As mentioned above, only two image buffers are necessary to process the output data. As filter 18 was rotated in the frequency plane, the two buffers accumulated the intensity and intensity-squared at each pixel. From these two moments, the mean and the standard deviation were computed. The ratio of the mean to the standard deviation forms a final output image. The ratio is quantitatively related to the correlation coefficient $\rho$ of Eq. (10). If a target image is located at a particular pixel, this ratio is large; whereas at other locations, the signal is speckle-like and the ratio is approximately unity. This is easily seen in a suitable isometric or three-dimensional plot of the ratio $\mu/\sigma$.

The simulation required about 10 hours of CPU-time on a dedicated DEC$\mu$VAX II computer. It should be appreciated that all of these computations can be performed in an optical system as rapidly as the filter 18 can be rotated and the intensities digitized into the frame buffers. Thus, the holographic filter is naturally implemented in an optical system because it relies on multiple correlation computations with large complex kernel functions.

Three different simulation tests were made with the system depicted in the FIGURE. Each test used input images differing only in the amount and type of noise added. Four distinct images were present in the input image, with two of the images being the same but rotated relative to one another and of the type which is desired to be identified. The other two images were of the same general form, but different in a number of details. An isometric or three-dimensional plot of the final system output (i.e., the accumulated mean to standard deviation ratio) was obtained. Two peaks were clearly indicated at the location of the two targets in the input plane. The two non-target images in the input scene did not produce any noticeable response.

Using the same input scene, uniformly distributed, spatially uncorrelated noise was added. The input targets had an amplitude of 1.0, and a noise range between $+/-1.0$. The system output obtained showed the maxima locating the targets to be reduced, but that the targets were still clearly detected. A third test was also made with the same input image but with structured noise added. The noise was in the form of a bar pattern across the target images. In addition, the left side of the targets included a 2:1 variation in intensity to represent nonuniform illumination (i.e. glint). Additive noise ranges were between $+/-0.5$. The final input again showed the peak value to be decreased, but the targets were still easily detected.

These examples demonstrated the noise robustness of the optical correlation system 10. Similar results were also obtained with other input images.

The rotating filter described above is naturally implemented in the frequency plane of an optical correlator. Computer generated holograms of both spatial plane and frequency plane filters have been constructed. With spatial plane filters, the holograms are used indirectly. In particular, the reconstructed holographic image is used as the input image for an optically recorded frequency plane filter. This method is convenient because the optical wavelength does not determine the hologram scale. Thus, generating holograms using high-quality mechanical plotters followed by photo-reduction is reasonable.

In practice, however, the indirectly-fabricated filter is difficult to align. The best results have been obtained using frequency filters generated directly using an electron beam. The e-beam computer generated holograms are encoded using the projection technique described in "Nondetour Phase Digital Holograms: An Analysis", N. Gallagher and J. Bucklew, *Applied Optics*, Vol. 19, p. 4266 (1980). The hologram contained 512 ×512 cells. Each cell contained four phase quantization subcells and 32 amplitude quantization levels. The phase and amplitude were computed at the center of each subcell.

An e-beam data file was generated in standard MEBES format and written onto magnetic tape. The final hologram was generated by a Perkin-Elmer electron beam system. The e-beam spot size was typically 0.25 microns. The quartz holographic substrate was flat to within 2 microns over the 5 centimeter square surface. Standard mask processing resulted in a 5 millimeter square, binary hologram recorded in chromium with an optical density of about 3.0. It should be appreciated that many filters can be written on a single substrate. Each hologram contained the filter information in the center and an alignment grating around its perimeter (discussed subsequently).

The quantization error was reduced and the diffraction efficiency of the computer generated hologram was increased by clipping the maximum computed amplitude of the filter to 0.7 of the maximum before encoding. Digital simulations showed that the clipping did not affect the performance of the filter.

As shown in the FIGURE, optical correlations system 10 is schematically depicted to show that the rotation of filter 18 causes a complication. In particular, as holographic filter 18 is rotated about its center, the diffracted correlation term or signal 20 in output plane 22 orbits about the optical axis. Fortunately, the correlation signal orbits in a ferris-wheel fashion, that is, the vertical axis remains vertical.

There are several procedures to eliminate the output image motion. One method is to fold the optical system immediately after the filter plane using two orthogonal mirrors which pivot in synchronism with the filter to remove the orbit. Another method is to attach a refracting wedge to the hologram to remove the offset angle. In early experiments, the two mirror system was used with the mirrors manually adjusted as the hologram rotated. It should be appreciated that in these experiments, the data was collected rather arbitrarily, usually at eight angular positions spaced approximately 45° apart. Data could also be collected as the filter is rotating.

The requirement that the filter be rotated complicates the experimental system in two ways. First, the holographic filter must be rotated exactly about its center. Second, care must also be taken to insure that the center of the hologram and the center of the Fourier transform the input are aligned at each rotation.

The e-beam computer generated hologram had two special alignment aids to allow easy adjustment. First, the exact center of the hologram was marked with a small alignment fiducial. Second, as mentioned above, the outside border of the hologram contained a grating at the carrier frequency of the hologram. When this grating was illuminated, the diffracted beam focused at the exact center of the correlation image. These critical alignment marks were easily incorporated in the e-beam hologram.

In the experiments described above, the target image at input plane 12 was about 5 millimeters high. An input transparency was placed in a liquid gate to eliminate phase errors. Alternately, an image from a spatial light modulator could have been used. Optical correlation system 10 included two 3 inch diameter, f/5 Fourier transform lenses 14. A rubicon camera was placed at output plane 22, and each correlation image or frame of data was digitized to 8-bits at 768×512 pixel locations. As described earlier, two buffers were used, one to accumulate the intensities of the frames and one to accumulate the square of the intensities. The spacing of the angles was not monitored except that it is desirable to have sufficient angular separation to decorrelate successive frames. The digitizer was on the bus of a DEC PDP 11-73 computer. The accumulated intensity data required more than 8-bit storage to avoid overflow. The image statistics were calculated on the computer. It should be appreciated that these operations could have been computed at video rates with the arithmetic logic unit on a dedicated image processing system.

With the present invention as described above, it should be appreciated that filter 18 contains all the information about the target pattern so that correlation system 10 is target specific and does not produce any false alarms. In addition, the target pattern is detected by monitoring discrete samples of the temporal pattern of the optical correlator system output so that detection is intensity invariant. Thus, the system of the present invention avoids the difficult energy normalization required by many other systems. The rotation of the filter to produce the temporal signature in the output plane also allows for simple signal processing procedures for detecting the required temporal signature. Furthermore, the data is taken at discrete arbitrary rotation angles further simplifying the system. The orbit of the correlation image as the filter is rotated in the frequency plane of the optical correlator system is advantageously removed as described above.

While the present invention has been developed primarily for military target recognition, it should be appreciated that the uses of the present invention are not restricted to such targets.

Thus, while the present invention has been described with respect to exemplary embodiments thereof, it will be understood by those of ordinary skill in the art that variations and modifications can be effected within the scope and spirit of the invention.

We claim:

1. A method of recognizing the presence of a particular target in a field of view which is target position, rotation, and intensity invariant, comprising the steps of:

preparing a target-specific filter, which is invariant to geometric distortions in target pattern due to changes in position in the field of view, rotation and intensity, from a combination of all eigenmodes of a pattern of the particular target;

imaging coherent radiation from the field of view into an optical correlator;

rotating said filter in the frequency plane of an optical correlator in order to produce a constant-amplitude rotational response in a correlation output plane when the particular target is present in the field of view; and detecting any constant amplitude response in the output plane to determine whether a particular target is present in the field of view, wherein said detecting step includes the steps of imaging a temporal pattern in the output plane with an optical detector having a plurality of pixels, said imaging occuring at a plurality of different arbitrary angles of rotation of the filter with angular separation sufficient to decorrelate successive frames, and determining a correlation coefficient for each pixel where a correlation coefficient of unity indicates the presence of a temporal signature of the particular target, wherein said step of determining a correlation coefficient includes the steps of accumulating the intensity and intensity-squared of each pixel such that the correlation coefficient is calculated from $$(1/N) \Sigma_k I_k / \sqrt{(1/N) \Sigma_k I_k^2}$$

where
$I_k$ = intensity value at each pixel k, and
$N$ = number of summations.

2. A method for recognizing as claimed in claim 1 wherein the preparing of the filter includes the step of encoding computer generated holograms using an electron beam to produce a frequency plane filter.

3. A method for recognizing as claimed in claim 2 wherein the preparing of the filter includes the step of clipping a maximum computed amplitude of the filter by about 0.7 of the maximum before the encoding step.

4. A method for recognizing as claimed in claim 1 wherein said rotating step includes the rotating of the filter about the center thereof.

5. A method for recognizing as claimed in claim 1 and further including the step of eliminating orbiting of the constant response caused by rotation of the filter.

6. A method for recognizing as claimed in claim 1, wherein said detecting step further includes collecting data from said imaging step as said filter is rotating.

* * * * *